Jan. 15, 1946.  E. A. F. REDMER  2,392,999
AIR CHUCK
Filed Feb. 2, 1944
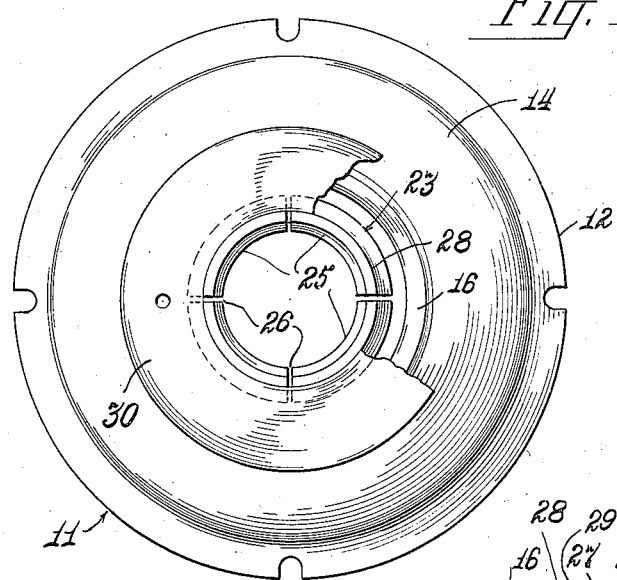
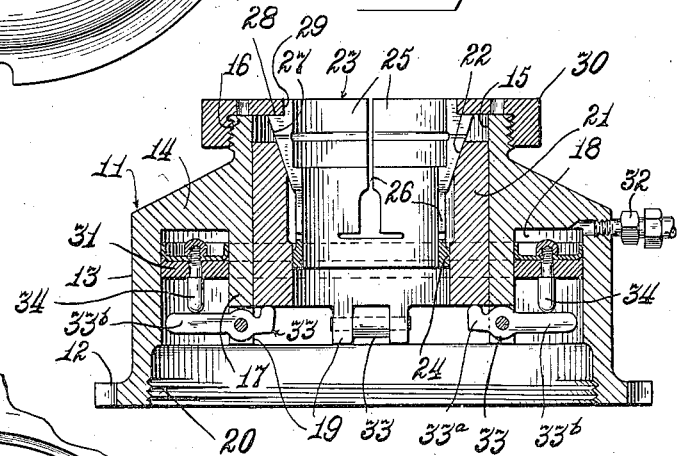
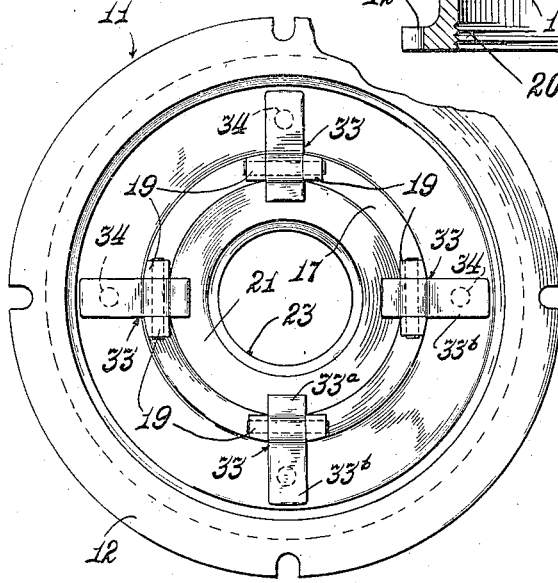
INVENTOR
EDWIN A. F. REDMER
ATTORNEY Patented Jan. 15, 1946

2,392,999

UNITED STATES PATENT OFFICE 2,392,999

AIR CHUCK

Edwin A. F. Redmer, Chicago, Ill.

Application February 2, 1944, Serial No. 521,004

7 Claims. (Cl. 279—4)

The invention relates to improvements in chucks and more particularly to chucks of a kind having fluid pressure actuated reciprocable means operable to close the jaws of a collet contained therein.

The present invention is concerned with improvements in the structural organization of a fluid pressure operated chuck of the character shown and claimed in my Patent No. 2,338,060, dated December 28, 1943. The chuck herein disclosed and embodying features of the present invention is of a kind intended to be rested firmly upon the bed of an automatic machine, such as for example, a drill press, in axial alignment with the tool of the machine so as to locate and hold small parts firmly in place for accurate tooling. Chucks of this character necessarily must be capable of gripping and releasing a part rapidly otherwise much valuable production time is lost, and further the chuck must automatically locate the part with respect to the tool preferably during the gripping operation. It is therefore an object of the present invention to provide an improved chuck of the kind referred to which is not expensive to manufacture, is very easy to assemble and disassemble should repair or replacement of any of its parts become necessary, and which is very efficient in use and highly practical.

The chuck of my previous invention identified hereinabove embodies a structure which necessitates a relatively large housing or body and as a consequence the chuck is heavy and its use on automatic machines having an extremely small bed often is exceedingly difficult of accomplishment and in some instances impossible. It is therefore another object of the present invention to provide a chuck of the kind exemplified herein which is extremely compact in its structural organization and hence easily enclosed within a housing or body of such size as to render the assembly light in weight and especially suited for use in association with machines having small beds.

Other and further objects of the present invention will be apparent from the following description and claims and are illustrated in the accompanying drawing which, by way of illustration, show a preferred embodiment and the principle thereof and which is considered to be the best mode for applying that principle. Other embodiments of the invention embodying the same or equivalent principle may be used and structural changes may be made as desired by those skilled in the art without departing from the present invention and the purview of the appended claims.

In the drawing:

Fig. 1 is a top plan view of the chuck embodying features of the present invention, showing a portion of the cap ring broken away.

Fig. 2 is an axial sectional view of the chuck.

Fig. 3 is a bottom plan view of the chuck.

The fluid pressure operated chuck exemplified in the accompanying drawing is wholly enclosed within a hollow body, as at 11, having an external base flange 12 at the lower end of a circular outer wall 13. The wall merges into a relatively thick top wall 14 having a large axial opening 15 surrounded at its outer end by an annular flange 16. An internal circular wall 17, cast integral with and extending downwardly from the inside face of the top wall 14, provides an extension for the axial opening 15 and said wall is spaced concentrically from the outer wall 13 so as to thereby provide a circular space 18 for a purpose to be described presently. The inner wall 17 terminates short of the bottom of the hollow body and its bottom edge has a plurality of pairs of depending ears 19 preferably cast integral therewith. These pairs of ears, which are for a purpose to be explained presently, are circumferentially spaced apart and any suitable number of pairs such as for example, two, three or the four pairs illustrated, may be provided. It may be desired to attach the chuck to a lathe and for this purpose internal threads 20 are provided at the open bottom of the hollow body 11.

A sleeve 21 is slidably disposed in the axial opening 15 and the upper margin of its inside circumferential face is inclined outwardly uniformly to provide an annular cam surface 22. A collet 23 is slidably disposed in the sleeve 21. The collet 23 includes a bearing portion 24 at its lower end which has a free sliding fit within the sleeve 21 and a plurality of jaws 25 formed at its upper end by longitudinal slots 26. The outside face of the end of the collet having the jaws 25 is tapered outwardly as at 27, to have matching engagement with the annular cam surface 22 in the sleeve and it is circumferentially shouldered at its free end as at 28 to fit snugly into an axial opening 29 formed in a retaining cap 30 screwed onto the annular body flange 16.

It should be apparent that when the sleeve 21 is located in the position shown in Fig. 2, the collet 23 is firmly held against movement relative to the body 11 and that should the sleeve be moved longitudinally upwardly over the collet, the collet jaws 25 will be contracted radially because of the camming action thereon resulting from the matched tapered surfaces at 22 and 27. Longitudinal movement of the sleeve is effected by fluid pressure means acting upon the bottom end of said sleeve.

As shown, a circular piston 31 is arranged within the circular space 18 and an inlet for liquid pressure, such as air, is provided at the upper end of said space, as through a nipple 32, so that upon the admittance of air under pressure into the space 18 above the piston 31, said piston is forced downwardly.

A plurality of levers 33, one pivotally mounted between each pair of ears 19, provide an operating connection between the piston and the sleeve 21 so that downward movement of the piston is transmitted to the sleeve for raising said sleeve to close the jaws 25. The levers 33 each have one end portion 33a extended beneath the sleeve 21 thereby providing the sole support to limit downward movement of said sleeve. The other ends 33b of said levers project into the annular space 18 beneath the piston 31 and said piston is fitted with circumferentially spaced contact pins 34 each of which is in alignment with and intended to rest upon a lever end 33b.

Accordingly, downward movement of the piston causes the lever ends 33b to be moved downwardly so as to thereby raise their opposite ends 33a and carry the sleeve 21 upwardly over the jaws 25 to contract them. When liquid pressure on the piston is relieved, the inherent tendency of the jaws to return to their initial expanded position forces the sleeve 21 downwardly, thus rocking the levers 33 in an opposite direction and elevating the piston 31.

It should be evident that the opening and closing of the jaws 24 is instantaneous in response to admittance or relief of liquid pressure on the piston and that the jaws are capable of being contracted around any object placed therein with sufficient firmness to retain such object in position to be worked upon. Further, the construction and organization of the parts is such that a very practical, compact and durable chuck is provided which does not require a large area upon which to rest and hence is very useful.

I claim:

1. In a chuck, a hollow body having a circular internal wall surrounding an axial opening, a circular air chamber in said body surrounding said internal wall, a sleeve slidably disposed in said opening, a collet disposed in said sleeve, means securing the collet against movement in said body, co-operating means between the sleeve and collet for closing the jaws of said collet when the sleeve is moved in one direction and for permitting the opening of said jaws when the sleeve moves in the opposite direction, and means for moving the sleeve in one direction only including levers pivotally mounted on said internal wall and fluid pressure means acting on one end of the levers for moving the same.

2. In a chuck, a hollow body having a circular wall surrounding an axial opening, a circular air chamber in said body surrounding said wall, a sleeve slidably disposed in said opening, a collet disposed in said sleeve, means securing the collet against movement in said body, co-operating means between the sleeve and collet for closing the jaws of said collet when the sleeve is moved in one direction and for permitting the opening of said jaws when the sleeve moves in the opposite direction, and means for moving the sleeve in one direction only including levers pivotally mounted in said body and fluid pressure means operable in the air chamber and acting on one end of the levers for moving the same.

3. In a chuck, a hollow body having a circular internal wall surrounding an opening, a circular air chamber in said body surrounding said internal wall, a sleeve slidably disposed in said opening, a collet disposed in said sleeve, means securing the collet against movement in said body, co-operating means between the sleeve and collet for closing the jaws of said collet when the sleeve is moved in one direction and for permitting the opening of said jaws when the sleeve moves in the opposite direction, a plurality of levers pivotally mounted on said internal wall each having an end co-acting with said sleeve, and a piston in said air chamber co-acting with the other ends of said levers for moving the same to move the sleeve in a direction to close said jaws.

4. In a chuck, a body having concentric inner and outer circular walls defining an annular space, a top wall connecting said inner and outer walls, a sleeve slidably disposed within said inner wall, a collet disposed in said sleeve, a cap firmly securing the collet against movement in said body in one direction, co-operating means between the sleeve and collet for closing the jaws of said collet when the sleeve is moved in one direction and for permitting the opening of the jaws when the sleeve is moved in the opposite direction, at least one lever pivotally mounted on said internal wall having an end co-acting with said sleeve, and a circular piston operable in the space between said inner and outer walls co-acting with the other end of said lever for moving the same to move the sleeve in a direction to close said jaws.

5. In a chuck, a body having concentric inner and outer circular walls defining an annular space, a top wall connecting said inner and outer walls, a sleeve slidably disposed within said inner wall, a collet disposed in said sleeve, means firmly securing the collet against movement in said body, co-operating means between the sleeve and collet to prevent movement of the collet in the direction of the sleeve and for closing the jaws of said collet when the sleeve is moved in one direction and for permitting the opening of the jaws when the sleeve is moved in the opposite direction, a plurality of levers pivotally mounted on said internal wall each having an end co-acting with said sleeve, a circular piston operable in the space between said inner and outer walls co-acting with the other ends of said levers for moving the same to move the sleeve in a direction to close said jaws.

6. In a chuck, a body having a circular opening, a sleeve slidably disposed in said opening, a collet disposed in said sleeve, means securing the collet against movement in said body, co-operating means between the sleeve and collet for closing the jaws of said collet when the sleeve is moved in one direction and for permitting the opening of said jaws when the sleeve is moved in the opposite direction, an air chamber in said body surrounding the wall of said opening, a circular piston in said chamber, and means for moving the sleeve in one direction to close said jaws upon movement of the piston in response to fluid pressure means acting upon said piston.

7. In a chuck, a body having a circular wall surrounding an opening, a sleeve slidably disposed in said opening, a collet disposed in said sleeve, means securing the collet against movement in said body, co-operating cam surfaces in the sleeve and on the collet for closing the jaws of said collet when the sleeve is moved in one direction and for permitting the opening of said jaws when the sleeve is moved in the opposite direction, an annular air chamber in said body having as one of its walls said circular wall, a circular piston in said air chamber, and means operatively connecting the sleeve and said piston for moving the sleeve in one direction to close said jaws upon movement of the piston in response to fluid pressure means acting upon said piston.

EDWIN A. F. REDMER.